UNITED STATES PATENT OFFICE.

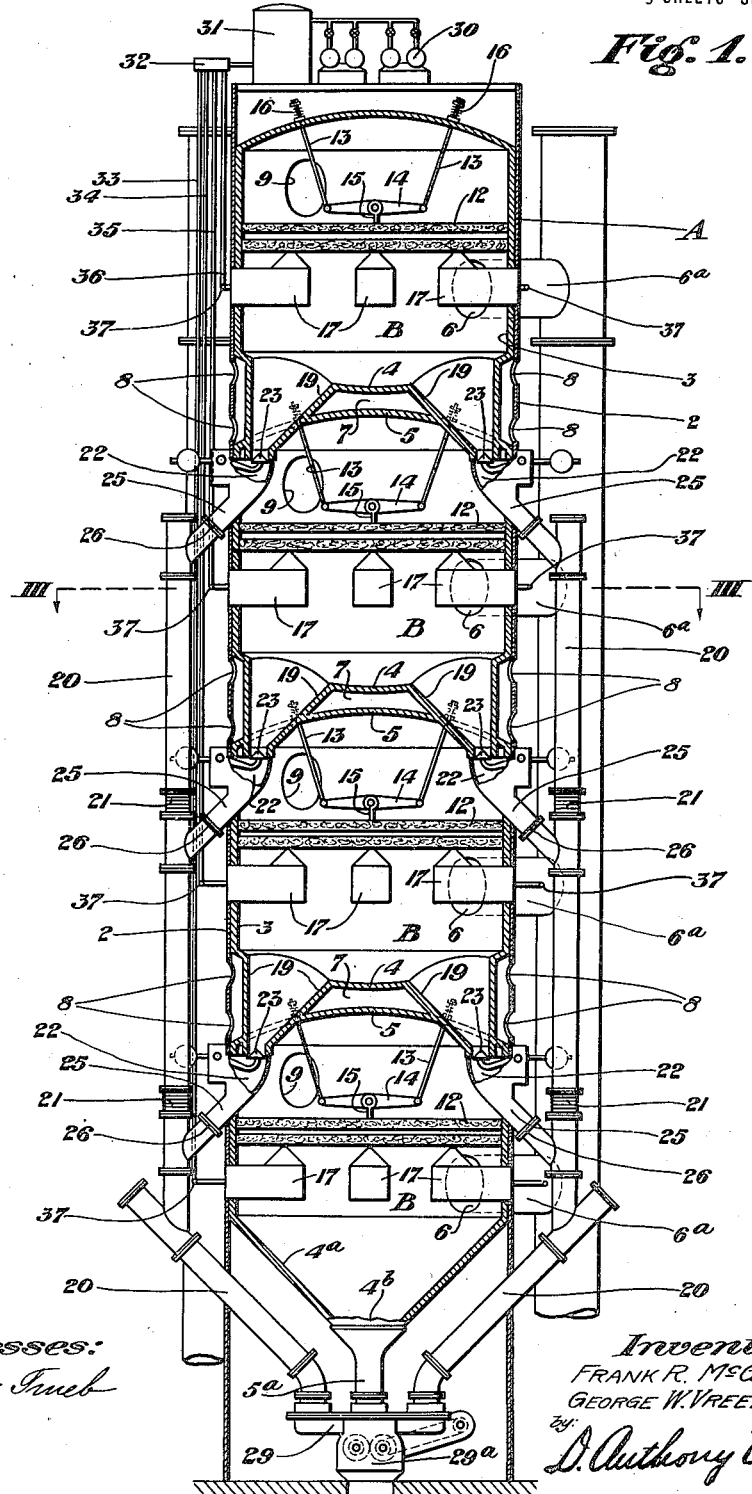

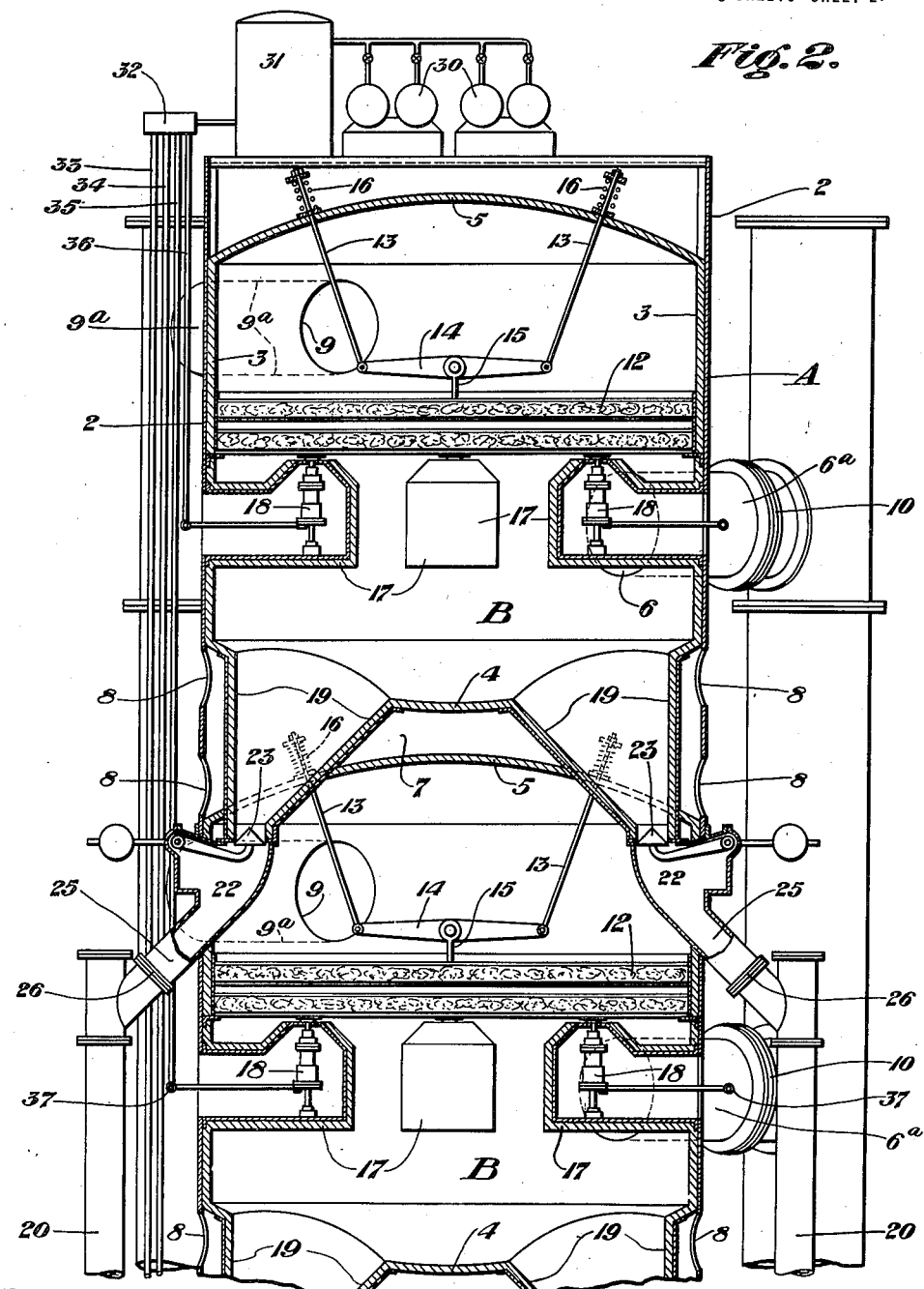

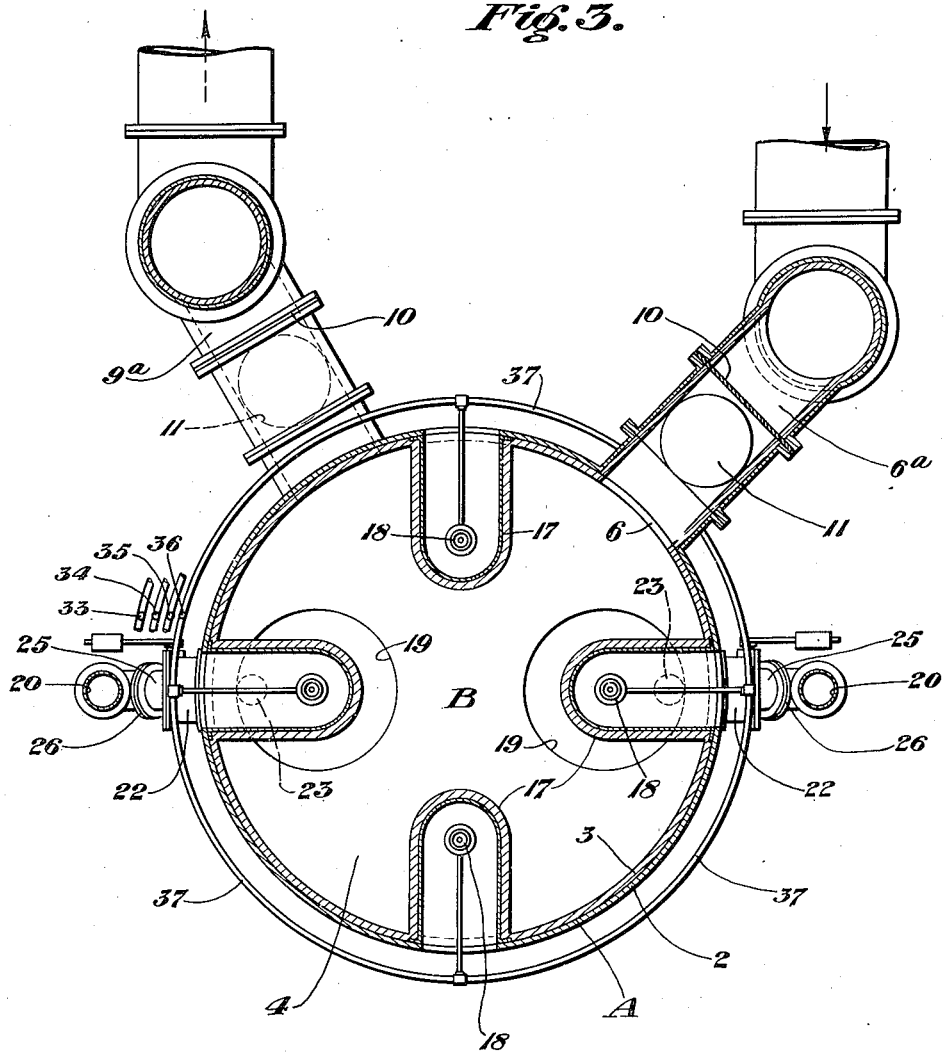

FRANK R. McGEE AND GEORGE W. VREELAND, OF STEUBENVILLE, OHIO.

TOWER GAS CLEANER.

1,413,126. Specification of Letters Patent. Patented Apr. 18, 1922.

Application filed June 22, 1921. Serial No. 479,515.

*To all whom it may concern:*

Be it known that we, FRANK R. McGEE and GEORGE W. VREELAND, citizens of the United States, and residents of Steubenville, in the county of Jefferson and State of Ohio, have invented certain new and useful Improvements in Tower Gas Cleaners, of which the following is a specification.

This invention relates to gas cleaners, and more particularly to dry gas cleaners for use in cleaning particles of coke, ore, lime and other foreign matter from the gas produced by blast furnaces, and has for one of its objects the provision of such a device that will have a higher efficiency than the cleaners heretofore constructed.

Another object is to so construct a cleaner of this class in the form of a tower, with several cleaning chambers built one above the other, so as to require a minimum amount of foundation and ground area, facilitate the collection of the matter taken from the gas, and to facilitate their construction.

Still another object is to provide each of the several cleaning chambers with filter mats having improved and novel mountings, and to provide improved and novel shaking or vibrating mechanism for said mats.

Other objects and advantages may be more fully brought out in the accompanying specification and illustrated in the accompanying drawings, in which—

Figure 1 is a side elevation of a cleaner constructed in accordance with our invention, having its outer wall partly broken away, showing the interior construction.

Figure 2 is an enlarged sectional elevation.

Figure 3 is a sectional plan view taken on the line III—III of Figure 1.

Referring more particularly to the drawings, the letter A designates the outer cylindrical shell or wall of the cleaner as a whole, which is preferably composed of metal sheet plate 2 having a coating of any suitable heat insulating material 3 applied thereto. The cleaner is subdivided into a plurality of cleaning chambers B, by pairs of transverse concave and convex walls 4 and 5, which form concave bottom and convex or arched top walls for each chamber. The transverse walls 4 and 5 are coated or covered with heat insulating material similar to the walls A.

It will thus be apparent that all the chambers B are provided with a concave bottom wall and an arched top wall, with the exception of the lowermost or bottom chamber, which is provided with a cone shaped bottom $4^a$ having a central discharge opening $4^b$ therein provided with an outlet pipe $5^a$.

The transverse walls 4 and 5 are spaced an appreciable distance apart forming an air circulation chamber or space 7 open to the atmosphere through suitable ports 8 in the shell or wall A.

The cleaning chambers B are provided with a gas inlet port 6 adjacent their bottom and a gas outlet port 9 adjacent their top which ports are connected with suitable mains by pipes $6^a$ and $9^a$, respectively, which communicate therewith and which are provided with suitable goggle-valves 10 and butterfly-valves 11 adapted to be closed to shut off the inlet and outlet ports of any chamber when desired.

The cleaning chambers B are divided at a point intermediate the inlet and outlet ports by a filter mat 12 which extends transversely of the chamber and is supported by rods 13 which are pivotally secured to an equalizing bar 14, which is connected to a centrally arranged anchor 15 secured in said mat. The rods 13 extend upwardly at an angle through the chamber B and through suitable apertures in the top wall 5 and into the space 7 between the walls 4 and 5, and suitable coiled springs 16 are arranged around the upper end of said rods to form a cushioned or resilient support for said mats. The mats 12 are preferably composed of compressed steel wool, and all gas coming into the chambers B through the inlet ports 6 must pass through the mats 12 before it can pass out through the outlet port 9. Therefore the gas is thoroughly cleaned before it leaves the chamber.

Portions of the side wall of each chamber below the mat 12 are cut away and substantially rectangular housings 17 are extended into the chamber from said cut away portions to provide enclosures for air hammer shakers or vibrators 18 or similar devices adapted to vibrate or shake the mats 12 to remove the dust and other matter filtered from the gases. The housings 17 are open to the atmosphere and readily accessible for repairs or adjustments of the shaking or vibrating mechanism. Of course it will be understood that the valves 10 and 11 in the pipes 6ª and 9ª are closed during the time the mats are being vibrated to prevent circulation within the chamber.

The transverse walls 4 and 5 are apertured at diametrically opposite points, and funnel-shaped hoppers 19 are secured in the apertures and extend into the top of the next lower chamber, forming outlets for the dust and other matter removed from the mats 12.

Dust receiving and conveying pipes 20 are arranged vertically along each side of the cleaner and provided with a plurality of expansion joints 21.

A plurality of dust receiving pockets 22 are inserted in openings formed in the side walls A adjacent the tops of all of the respective chambers B excepting the top chamber, and are connected with the discharge mouth or port of the hoppers 19. A suitable counterweighted valve 23 is mounted in each of the pockets 22 and adapted to seat against the lower end of the hopper 19 and to maintain its seated position until sufficient dust collects in the hopper 19 to overcome the counterweight of the valve.

The pockets 22 are connected to the dust conveying pipes 20 by connecting pipes 25 which extend downwardly on an angle, and are provided intermediate their ends with goggle-valves 26.

The lower end of the dust conveying pipes 20 and the outlet pipe 5ª extending from the bottom or lowermost chamber B are all connected with or enter receiving ports of a pug mill feeder 29 which feeds a pug mill 29ª.

The operation of the cleaner shown and described is as follows:

Gas enters the cleaner through the inlet ports 6 in the lower portion of the chambers B, the gas then flows upwardly through the cleaning mats 12, which free the gase of all dust and foreign matter, into the upper portion of the chambers, from which it flows out through the outlet ports 9.

After the cleaner has been in operation for a certain time the mats will become clogged. The valves 10 and 11 are then closed in the pipes 6ª and 9ª of one or more of the chambers B, and the vibrating hammers for that chamber or chambers set in motion to clean the mats by vibrating or shaking out the dust.

If air hammer mechanism 18 is used to vibrate the mats 12 a suitable compressor 30 and reservoir tank 31 is mounted on the top of the cleaner, and the air from the tank 31 is released through a suitable distributing valve 32 into the respective air lines 33, 34, 35 and 36, which are connected to the respective series of air hammers 18 by manifolds 37.

While we have illustrated our cleaner in a somewhat diagrammatic form it embodies our invention. However, many details of construction, such as the feed mains, steps and platforms on which the operators stand when operating the device, and the like have been left off the present illustrations for purpose of clearness, since they do not form a part of the present invention.

We claim:—

1. In a dry gas cleaner having a plurality of gas cleaning chambers, a filter cleaning mat in each of said chambers, said cleaning mats being resiliently supported by overhead supports, and a plurality of fluid operated hammers arranged below each of said mats and adapted to impart a series of vibrating impacts against the bottom of the respective mats.

2. In a dry gas cleaner having a plurality of gas cleaning chambers, a filter cleaning mat in each of said chambers, said cleaning mats being resiliently supported by overhead supports, a plurality of fluid operated hammers arranged below each of said mats and adapted to impart a series of vibrating impacts against the bottom of said mat, and individual housings for each of said hammers, said housings extending into said cleaning chambers and having one end opening through the side wall of said cleaner.

3. In a dry gas cleaner having a plurality of gas cleaning chambers arranged one above the other in tower formation, a filter cleaning mat in each of said chambers, resilient overhead supports for each of said mats, said supports comprising an equalizing bar pivotally mounted on an anchor secured in said mat, and supporting rods pivotally secured to the ends of said equalizing bar and resiliently mounted in the top wall of said chambers.

4. In a dry gas cleaner having a plurality of gas cleaning chambers arranged one above the other in tower formation, a filter cleaning mat in each of said chambers, resilient overhead supports for each of said mats, said supports comprising an equalizing bar pivotally mounted on an anchor secured in said mat, and supporting rods pivotally secured to the ends of said equalizing bar and resiliently mounted in the top wall of said chambers, and means below each of said mats for imparting a series of vibrating impacts against the bottom of said mats.

In testimony whereof we have hereunto signed our names.

FRANK R. McGEE.
GEO. W. VREELAND.